United States Patent
Bettendorff et al.

(10) Patent No.: US 10,015,004 B2
(45) Date of Patent: Jul. 3, 2018

(54) PREVENTING A NETWORK FROM PROPAGATING INCORRECT TIME INFORMATION

(71) Applicant: Landis+Gyr Innovations, Inc., Alpharetta, GA (US)

(72) Inventors: John Bettendorff, San Francisco, CA (US); Pushpesh Kumar Deshmukh, Alpharetta, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 86 days.

(21) Appl. No.: 15/363,089

(22) Filed: Nov. 29, 2016

(65) Prior Publication Data
US 2018/0152343 A1 May 31, 2018

(51) Int. Cl.
| H04L 7/00 | (2006.01) |
| H04L 12/24 | (2006.01) |
| H04L 12/26 | (2006.01) |
| H04J 3/06 | (2006.01) |
| H04W 4/80 | (2018.01) |
| H04W 56/00 | (2009.01) |
| H04W 84/18 | (2009.01) |

(52) U.S. Cl.
CPC .......... *H04L 7/0004* (2013.01); *H04J 3/0638* (2013.01); *H04L 41/0803* (2013.01); *H04L 41/0866* (2013.01); *H04L 43/106* (2013.01); *H04W 4/80* (2018.02); *H04W 56/001* (2013.01); *H04W 84/18* (2013.01)

(58) Field of Classification Search
CPC .......... G06F 1/04–1/14; H04J 3/0635–3/0697; H04L 7/0004–7/10; H04L 41/0803–41/0873; H04L 43/106; H04W 4/80; H04W 56/0005–56/0095; H04W 84/18–84/22

See application file for complete search history.

(56) References Cited

U.S. PATENT DOCUMENTS

| 2009/0196277 A1 | 8/2009 | Horn et al. |
| 2014/0029603 A1 | 1/2014 | Nomura et al. |

FOREIGN PATENT DOCUMENTS

| WO | 0048367 | 8/2000 |

OTHER PUBLICATIONS

"IEEE Standard for Low-Rate Wireless Personal Area Networks (WPANs)", DRAFT IEEE P802.15.4-REVc/D00-BTM, Oct. 5, 2015, 761 pages. (previously submitted on Apr. 18, 2017).

(Continued)

*Primary Examiner* — Timothy J Weidner
(74) *Attorney, Agent, or Firm* — Kilpatrick Townsend & Stockton LLP

(57) ABSTRACT

Prior to joining a device to a network, the device is connected to an external system via a local connection. The external system provides the device with a local time stamp that includes a local time value and a local time error value. The device may use the time information to communicate with the external system. After the device is joined to the network, the device may transmit a communication on the network that includes time information. If so, then the communication includes a time value based on the device's time value and a time error value set to a value indicating a maximum error. The network is protected from potentially poor quality time information. Any device that receives the communication rejects the time information since the time error value indicates a maximum error.

19 Claims, 3 Drawing Sheets

(56) References Cited

OTHER PUBLICATIONS

"Time Cluster and ZCL Time", NXP, ZigBee Cluster Library User Guide section 14, Revision 2.1 Available online:https://www.nxp.com/docs/en/user-guide/JN-UG-3077.pdf, Feb. 6, 2015, pp. 263-284.

International Patent Application No. PCT/US2017/060788, "International Search Report and Written Opinion", dated Jan. 25, 2018, 13 pages.

"IEEE Standard for Low-Rate Wireless Personal Area Networks (WPANs)", DRAFT IEEE P802.15.4-REVc;D00-BTM, Oct. 5, 2015, 761 pages.

PREVENTING A NETWORK FROM PROPAGATING INCORRECT TIME INFORMATION

TECHNICAL FIELD

The present invention relates to protecting a network from propagating incorrect time information, and more particularly managing time information received by a network device via a local interface.

BACKGROUND

Time is an important factor in a network since the operation of the network may depend upon the devices on the network having time that is correct and synchronized with the other devices on the network. In many networks time information is shared between devices. In these networks, if one of the devices interjects incorrect time into the network, the operation of the network may degrade or even fail.

To protect a network from propagating incorrect time interjected by a device, network devices may be configured by default to reject any time information received from a device that is not part of the network. This may create a problem for a device that requires time information for configuration. Since the device may not be able to join the network until it is configured, and the device cannot obtain time information until it joins the network, there is a need to provide time information to a device so that it can be configured, but to prevent the network from propagating potentially incorrect time information through the network.

SUMMARY

Time information may be provided to a device prior to the device joining a network so that it can communicate with an external system. The device may be connected to an external device via a local connection and may receive and use time information received from the external device. Even if the device is configured to reject time information received by a local connection once it joins the network, the device accepts time information from the external system. The device sets its time value to the time value received from the external device and sets its time error value to a maximum value. Once the device is joined to the network, time information initially communicated on the network by the device includes the maximum time error value. Any other device that receives the time information from the device rejects the time information because the maximum time error value indicates that the quality of the time value is poor.

These illustrative aspects and features are mentioned not to limit or define the invention, but to provide examples to aid understanding of the inventive concepts disclosed in this application. Other aspects, advantages, and feature of the preset invention will become apparent after review of the entire description.

DETAILED DESCRIPTION

Aspects of the invention allow a device to accept and use time information received via a local interface while protecting a network from propagating potentially incorrect time. Many devices are configured by default to reject a local time stamp, but may need time information to communicate with an external system and complete a configuration or maintenance process. Prior to joining the device to a network, the device is connected to an external system via a local connection. The external system provides the device with a local time stamp that includes a local time value and a local time error value. When the device is configured to reject a local time stamp and the device does not have valid time because it has not yet joined the network, the device accepts the local time value, and sets its time error value to a maximum value. The device may use the time information to securely communicate with the external system. After the device is joined to the network, the device may transmit a communication on the network that includes time information. If so, then the communication includes a time value based on the device's time value and a time error value set to the maximum value. Any device that receives the communication will reject the time information since the time error value indicates a maximum error.

Exemplary Operating Environment

Figure 1:
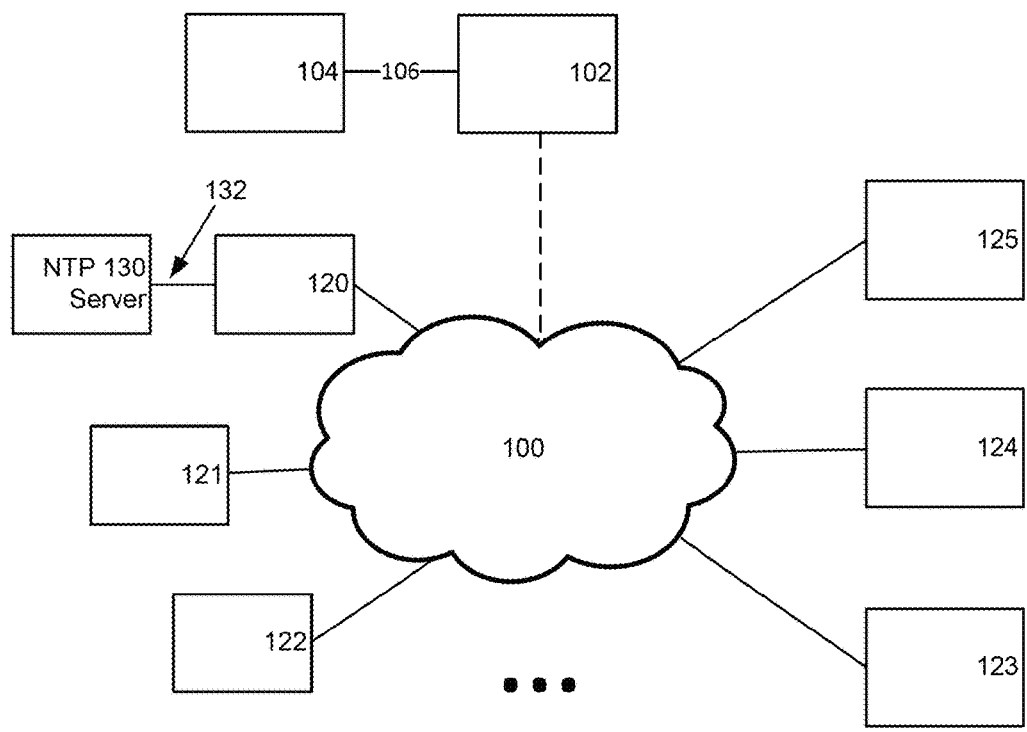
FIG. 1 is a block diagram illustrating an exemplary operating environment.

FIG. 1 illustrates an exemplary operating environment and includes a network 100 that connects a number of network devices 120-125 connected to the network. The network may be a wireless mesh network. In one example the network is part of an AMI network. One or more of the network devices may be connected to a trusted time source, such as an NTP server. FIG. 1 illustrates that network device 120 is connected to NTP server 130 via local connection 132. The NTP server 130 provides time information to network device 120 via local connection 132 and the network device 120 in turn transmits time information to other network devices connected to the network 100. The time information includes a time value and a time error value. As the time information is propagated through the network, each network device that receives the time information adjusts the time error value so that it reflects the age or accuracy of the time value. The age of the time value represents the time since the time value was received from a trusted time source. For example, network device 120 may receive a time value from NTP server 130 and may set its time value to the time value received from the NTP server. Network device 120 may also set its time error value to zero or to some other predefined value that indicates the time value was received from a trusted time source.

The NTP server provides updated time information to network device 120 on a regular basis and network device 120 in turn communicates time information to other network devices via network 100 so that the time propagating through the network is regularly updated. In one example, network device 120 communicates time information to other network devices by including a time value and a time error value in a maintenance packet and transmitting the maintenance packet on the network 100. When network device 121 receives a maintenance packet from another network device, it compares the time error value in the maintenance packet with its own time error value to determine whether the time value in the maintenance packet is more recent than its time value. When the comparison indicates that the time value in the maintenance packet is more recent, then network device 121 replaces its time value with the time value from the maintenance packet. In this situation, the network device 121 also adjusts its time error value to indicate a larger error than the received time error value. For example, if the received time error value is "2", the network device may adjust its time error value to "3" when a higher value indicates an older time value. When the comparison indicates that the time value in the maintenance packet is older, then the network device 121 maintains its time value and ignores the received time value.

In one example, a network device adjusts its time error value as time elapses. The adjustment is based on the accuracy of the network device's internal clock. For example, if a network device uses a high accuracy TCXO having 5 PPM or better accuracy, then the time error value may be adjusted by 10 μs whenever the time value is advanced by 1 second. If a network device uses an oscillator with 100 PPM accuracy, then the time error value may be adjusted by 100 μs whenever the time value is advanced by 1 second. Other adjustments may be used and may generally reflect the relative accuracy of the network device's clock FIG. 1 also illustrates a network device 102 and an external system 104 connected to the network device via local connection 106. The local connection may be any suitable connection that allows communications between the network device and the external system including, but not limited to, a Bluetooth connection or a serial connection. Since the network device 102 may need to be configured before it can join network 100, the connection to the network is shown with a dashed line. External system 104 may be any type of system and in one example is a computer system that includes a software application for configuring device 102 or for performing maintenance on the network. At least some of the communications between the network device 102 and the external system 104 may use digital signatures or other mechanisms that rely upon time information. If the network device does not have time information, then it may not be able to communicate using digital signatures and may not be able to complete configuration or join the network. In this situation, the external system 104 provides time information to the network device 102 so that the network device and the external system can communicate securely and the network device can be configured. In one example, the external system provides a time stamp via layer 2 of the network stack. Other systems may use a different layer or may communicate the time information in a different manner. The network device uses the time information from the external system, but sets its time error value to a value that indicates a maximum error.

Exemplary Method

Figure 2:
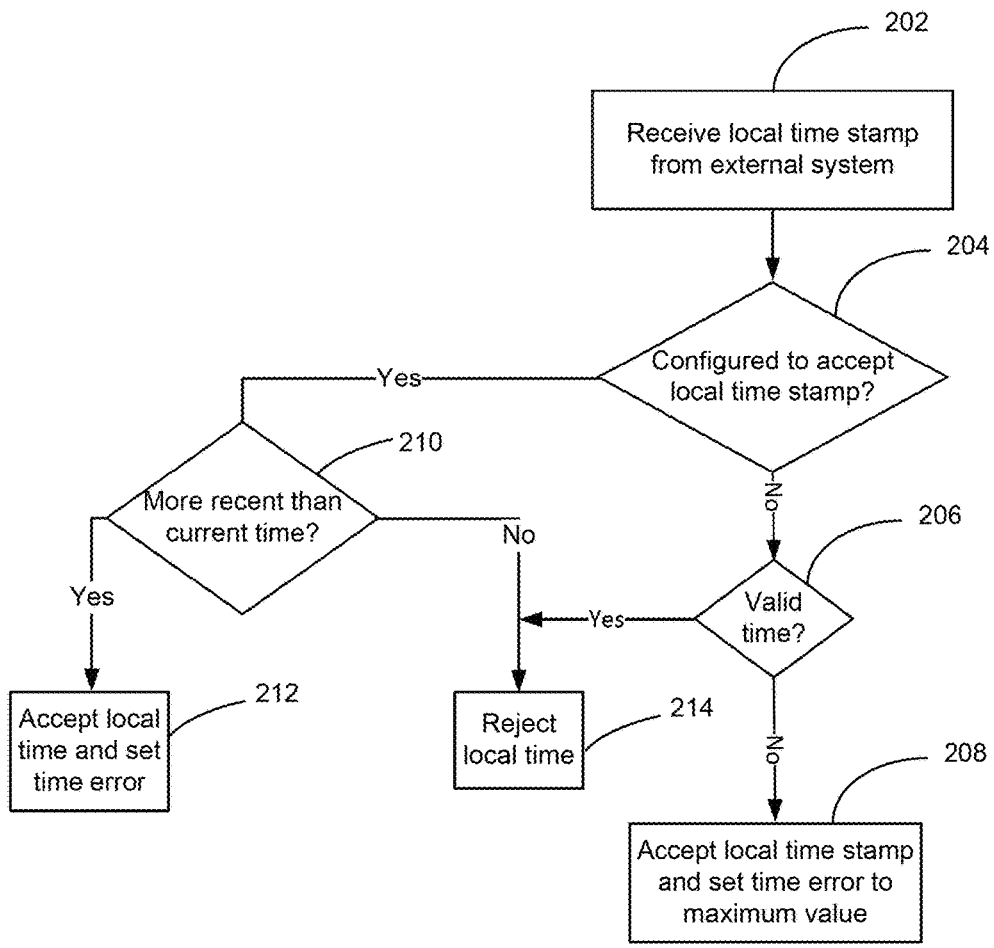
FIG. 2 is a flow diagram illustrating an exemplary method.

FIG. 2 illustrates an exemplary method that may be performed by the network device. After the network device and the external system are connected via a local connection, the network device receives a local time stamp from the external system via the local connection at 202. The local time stamp includes a time value and a time error value. The network device determines whether it is configured to receive a local time stamp, i.e., a time stamp from an external device received via a local connection, at 204. Generally a network device is configured to reject a local time stamp unless it is a device intended to be connected to an NTP server. In one example, the network device checks a configuration setting to determine whether it is configured to accept a local time stamp. To prevent a network device from introducing poor quality time into the network, many devices are configured to reject local time stamps. In one example, the configuration settings for the devices are set to reject a local time stamp at the time of manufacture. If the network device determines at 204 that it is configured to reject a local time stamp, then the method proceeds along the No branch to 206. The network device determines whether it has a valid time value at 206. Generally a device does not have a valid time value prior to configuration. If the network device determines at 206 that it does not have a valid time value, then the method proceeds along the No branch to 208. The network device accepts the local time stamp at 208 by setting its time value to the time value in the local time stamp and its time error value to a maximum error value. The maximum error value indicates that the time value is of poor quality.

The network device may proceed from 202 to 204 to 206 to 208 when it is initially connected to the external system. This results in the network device having time information so it can securely communicate with the external system and complete the configuration process. The time error value is set to a value indicating a maximum error so if another network device receives the time information, it ignores the time value. This provides an improvement over some current systems that require a connection to an NTP server to provide the network device with valid time prior to configuration.

If the network device determines at 206 that it has a valid time value, then the method proceeds along the Yes branch to 214. In one example, the device determines that it has valid time, if it has a non-zero time value and a time error value less than a maximum value. The network device rejects the local time stamp at 214 and continues to maintain its own time value and time error value. If the network device proceeds from 202 to 204 to 206 to 214, then the network device has valid time information and it does not accept the local time stamp. This situation may occur when the network device is joined to the network prior to its connection with the external system. Since the network device is already joined to the network, it has valid time information based on communications received from the network.

If the network device determines at 204 that it is configured to accept a local time stamp, then the method proceeds along the Yes branch to 210. The network device determines whether the time value in the local time stamp is more recent than the time value maintained by the network device at 210. The network device considers a more recent time value as a more accurate time value. In one example, the network device compares the time error value in the local time stamp and its time error value to determine whether the time value in the local time stamp is more recent than its time value. If the network device determines at 210 that the time value from the local time stamp is more recent, then the method proceeds along the Yes branch to 212. The network device accepts the local time stamp at 212 by setting its time value to the time value in the local time stamp and its time error value to an error value based on the time error value in the local time stamp. The network device may set its time error value to a value that indicates a greater time error than that indicated by the local time error value. If the network device proceeds from 202 to 204 to 210 to 212, then the network device is configured to accept a local time stamp. This situation may occur when the network device is intended for connection to an NTP server.

If the network device determines at 210 that the time value from the local time stamp is older, then the method proceeds along the No branch to 214. The network device rejects the local time stamp at 214 and continues to maintain its own time value and time error value. If the network device proceeds from 202 to 204 to 210 to 214, then the network device is configured to accept a local time stamp, but does not accept it. This situation may occur if the network device is connected to an NTP server through an intermediate device and the intermediate device loses its connection to the NTP server. In this situation, the time information in the network device may be more accurate than time information received from the intermediate device.

After the network device is configured and joined to the network, the network device may transmit a maintenance packet or other communication that includes time information onto the network. The maintenance packet may include a time value based on the time value maintained by the network device and a time error value based on the time error value maintained by the network device. When another network device receives the maintenance packet, the device compares the time error value in the maintenance packet with its own time error value. Since the time error value in the maintenance packet is set to a value that indicates a maximum error, the network device rejects the time value in the maintenance packet and maintains its own time value. In this manner, the time value from the network device is not propagated through the network.

Similarly, after the network device is configured and joined to the network, the network device may receive a maintenance packet or other communication that includes time information from another network device. The network device compares the time error value in the maintenance packet with its own time error value, which is set to a value indicating a maximum error. When the time error value in the maintenance packet indicates a valid time value (e.g., less than a maximum error), the network device sets its time value to the time value in the maintenance packet. In this manner, the network device receives valid network time.

Exemplary Network Device

Figure 3:
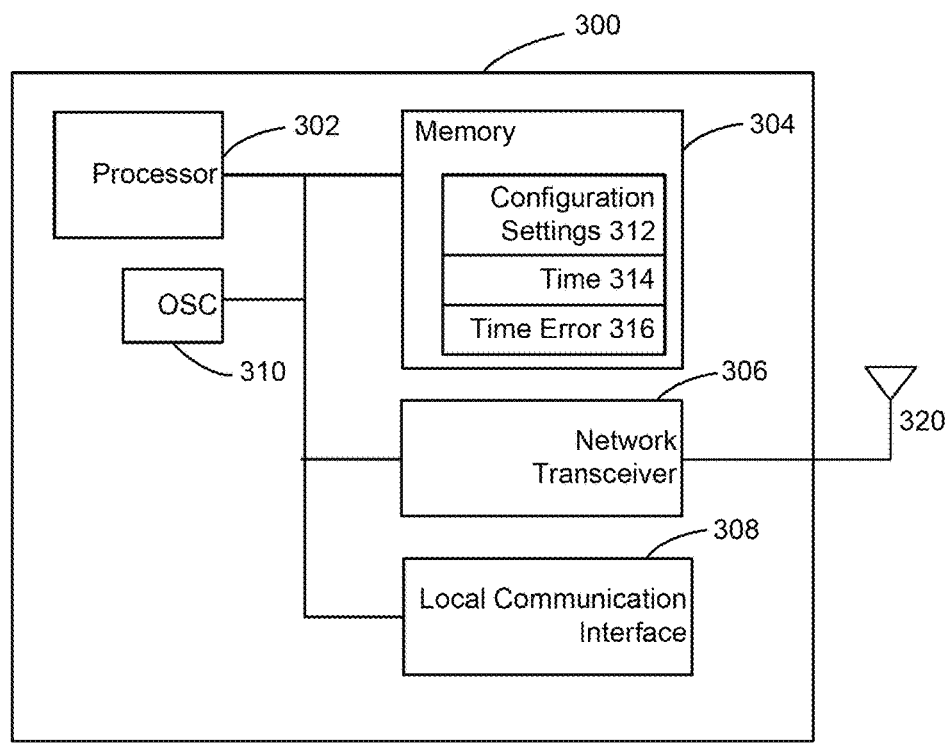
FIG. 3 is a block diagram illustrating an exemplary device.

FIG. 3 illustrates an exemplary network device 300, such as network device 102 or network device 120. The network device 300 includes a processor 302. Non-limiting examples of a processor include a microprocessor, an application-specific integrated circuit (ASIC), a state machine, a field programmable gate array (FPGA) or other suitable processing device. The processor can include any number of processing devices, including one. The processor 302 can be communicatively coupled to memory 204. The processor can execute computer-executable program instructions and/or access information stored in memory device.

The memory may store instructions that, when executed by the processor, cause the processor to perform operations described herein. The memory may be a computer-readable medium including, but not limited to, an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language.

The memory may also store configuration settings for the network device. In one example, the configuration settings are stored in non-volatile memory. The configuration settings may include one or more settings indicating whether the device is allowed to accept a local time stamp. As discussed above, the network device may receive a maintenance packet or other communication from the network that includes time information. If the network device does not receive time information, then it may transmit a request on the network requesting time information. The configuration settings of the device may specify how long the network device waits for time information before sending a request. The network device may include an oscillator 310. The oscillator may be used to maintain a time value 314. The network device may also maintain a time error value 316, which reflects the age or accuracy of the time value.

The network device may also include a network transceiver 306. Non-limiting examples of a transceiver include an RF transceiver and other transceivers for wirelessly transmitting and receiving signals. The network transceiver may be coupled to an antenna 320.

The network device may also include a local communication interface 308. Non-limiting examples of a local communication interface include a Bluetooth interface, a serial interface, and other interfaces for communicating with an external system.

The network device is not limited to the components illustrated in FIG. 3. In one example, the network device may also includes a metrology module for measuring consumption of a resource, such as electricity, water, or gas.

The foregoing is provided for purposes of illustrating, describing, and explaining aspects of the present invention and is not intended to be exhaustive or to limit the invention to the precise forms disclosed. Further modifications and adaptations of these embodiments will be apparent to those skilled in the art and may be made without departing from the scope and spirit of the invention. For example, time information may be communicated in any suitable manner. The use of a maintenance packet is not required. The external system may be connected to the network device for any purpose, not necessarily configuration. In addition, different arrangements of the components described above, as well as components and steps not shown or described are possible. Similarly, some features and sub-combinations are useful and may be employed without reference to other features and sub-combinations.

What is claimed is:

1. A method for configuring a device prior to joining the device to a network, comprising:

establishing communication with an external system, wherein the communication is established via a local communication interface connecting the device and the external system;

receiving a local time stamp from the external system via the local communication interface, wherein the local time stamp includes a local time value and a local time error value;

determining whether the device is configured to accept or reject a time stamp received via the local communication interface;

when the device is configured to reject the time stamp received via the local communication interface, determining whether the device has a valid device time value;

when the device time value is not valid, then setting the device time value to the local time value and setting a device time error value to a time error value representing a maximum error;

completing configuration of the device;

joining the device to the network;

including the device time value and the device time error value in a maintenance packet; and transmitting the maintenance packet on the network.

2. The method of claim 1, wherein the local communication interface is one of a Bluetooth connection or a serial connection.

3. The method of claim 1, wherein completing configuration of the device, includes transmitting a communication to the external system that includes a digital signature based on a current device time value.

4. The method of claim 1, further comprising:
updating the device time value to reflect elapsed time;
receiving a second maintenance packet transmitted by a second device via the network, wherein the second maintenance packet includes a second time stamp with a second time value and a second time error value;
comparing the second time error value to the device time error value; and
when the comparison of the second time error value and the device time error value indicates that the second time value is more recent than the updated device time value, then accepting the second time value as the device time value and setting the device error value to a value reflecting a larger error than the second time error value.

5. The method of claim 4, wherein after accepting the second time value and setting the device error value to a value reflecting a larger error than the second time error value, further comprising:
continuing to update the device time value;
including the updated device time value and the device time error value in a third maintenance packet; and
transmitting the third maintenance packet on the network.

6. The method of claim 1, wherein after completing configuration of the device, the device communicates with a plurality of network devices connected to the network to perform network maintenance.

7. The method of claim 1, wherein determining whether the device is configured to accept or reject a time stamp received via the local communication interface comprises checking a configuration setting of the device.

8. The method of claim 1, further comprising:
updating the device time value to reflect elapsed time;
receiving a second local time stamp from the external system via the local communication interface, wherein the second local time stamp includes a second local time value and a second local time error value;
determining whether the device is configured to accept or reject a time stamp received via the local communication interface;
when the device is configured to reject the time stamp received via the local communication interface, determining whether the device time value is valid;
when the device time value is valid, then rejecting the second local time stamp received via the local communication interface; and
continuing to update the device time value.

9. A device, comprising:
a local communication interface configured to connect to an external system;
a transceiver configured to communicate with network devices via a network;
an oscillator;
a memory device storing a plurality of device configuration settings;
a processing device configured to execute instructions stored in a computer-readable medium to perform operations comprising:
establishing communication with the external system, wherein the communication is established via the local communication interface;
receiving a local time stamp from the external system via the local communication interface, wherein the local time stamp includes a local time value and a local time error value;
determining whether the device is configured to accept or reject a time stamp received via the local communication interface;
when the device is configured to reject the time stamp received via the local communication interface, determining whether the device has a valid device time value;
when the device time value is invalid, then setting the device time value to the local time value and setting a device time error value to a time error value representing a maximum error;
maintaining the device time value using the oscillator;
including the device time value and the device time error value in a maintenance packet; and
transmitting the maintenance packet on the network via the network transceiver.

10. The device of claim 9, wherein the local communication interface is configured to provide one of a Bluetooth connection or a serial connection.

11. The device of claim 9, wherein the processing device is further configured to execute instructions comprising:
transmitting a communication to the external system that includes a digital signature based on a current device time value.

12. The device of claim 9, wherein the processing device is further configured to execute instructions comprising:
receiving a second maintenance packet transmitted by a second device via the network, wherein the second maintenance packet includes a second time stamp with a second time value and a second time error value;
comparing the second time error value to the device time error value;
when the comparison of the second time error value and the device time error value indicates that the second time value is more recent than a current device time value, then accepting the second time value as the device time value and setting the device error value to a value reflecting a larger error than the second time error value.

13. The device of claim 9, wherein the processing device is further configured to execute instructions comprising:
determining whether the device is configured to accept or reject a time stamp received via the local communication interface comprises checking the device configuration settings.

14. The device of claim 9, wherein the processing device is further configured to execute instructions comprising:
receiving a second local time stamp from the external system via the local communication interface, wherein the second local time stamp includes a second local time value and a second local time error value;
determining whether the device is configured to accept or reject a time stamp received via the local communication interface;
when the device is configured to reject the time stamp received via the local communication interface, determining whether the device time value is valid;

when the device time value is valid, then rejecting the second local time stamp received via the local communication interface; and continuing to maintain the device time value.

15. A method for configuring a device prior to joining the device to a network, comprising:
- establishing communication with an external system, wherein the communication is established via a local communication interface connecting the device and the external system;
- receiving a local time stamp from the external system via the local communication interface, wherein the local time stamp includes a local time value and a local time error value;
- determining whether the device is configured to accept or reject a time stamp received via the local communication interface;
- when the device is configured to reject the time stamp received via the local communication interface, determining whether the device has a valid device time value;
- when the device time value is not valid, then setting the device time value to the local time value and setting a device time error value to a time error value representing a maximum error;
- transmitting a communication to the external system that includes a digital signature based on a current device time value; and
- joining the device to the network.

16. The method of claim 15, further comprising:
maintaining the device time value;
including the device time value and the device time error value in a packet; and
transmitting the packet on the network.

17. The method of claim 15, further comprising:
maintaining the device time value;
receiving a second maintenance packet transmitted by a second device via the network, wherein the second maintenance packet includes a second time stamp with a second time value and a second time error value;
comparing the second time error value to the device time error value; and
when the comparison of the second time error value and the device time error value indicates that the second time value is more recent than a current device time value, then accepting the second time value as the device time value and setting the device error value to a value reflecting a larger error than the second time error value.

18. The method of claim 15, wherein determining whether the device is configured to accept or reject a time stamp received via the local communication interface comprises checking a device configuration setting.

19. The method of claim 15, further comprising:
receiving a second local time stamp from the external system via the local communication interface, wherein the second local time stamp includes a second local time value and a second local time error value;
determining whether the device is configured to accept or reject a time stamp received via the local communication interface;
when the device is configured to reject the time stamp received via the local communication interface, determining whether the device time value is valid;
when the device time value is valid, then rejecting the second local time stamp received via the local communication interface; and
continuing to maintain the device time value.

* * * * *